Patented Mar. 7, 1933

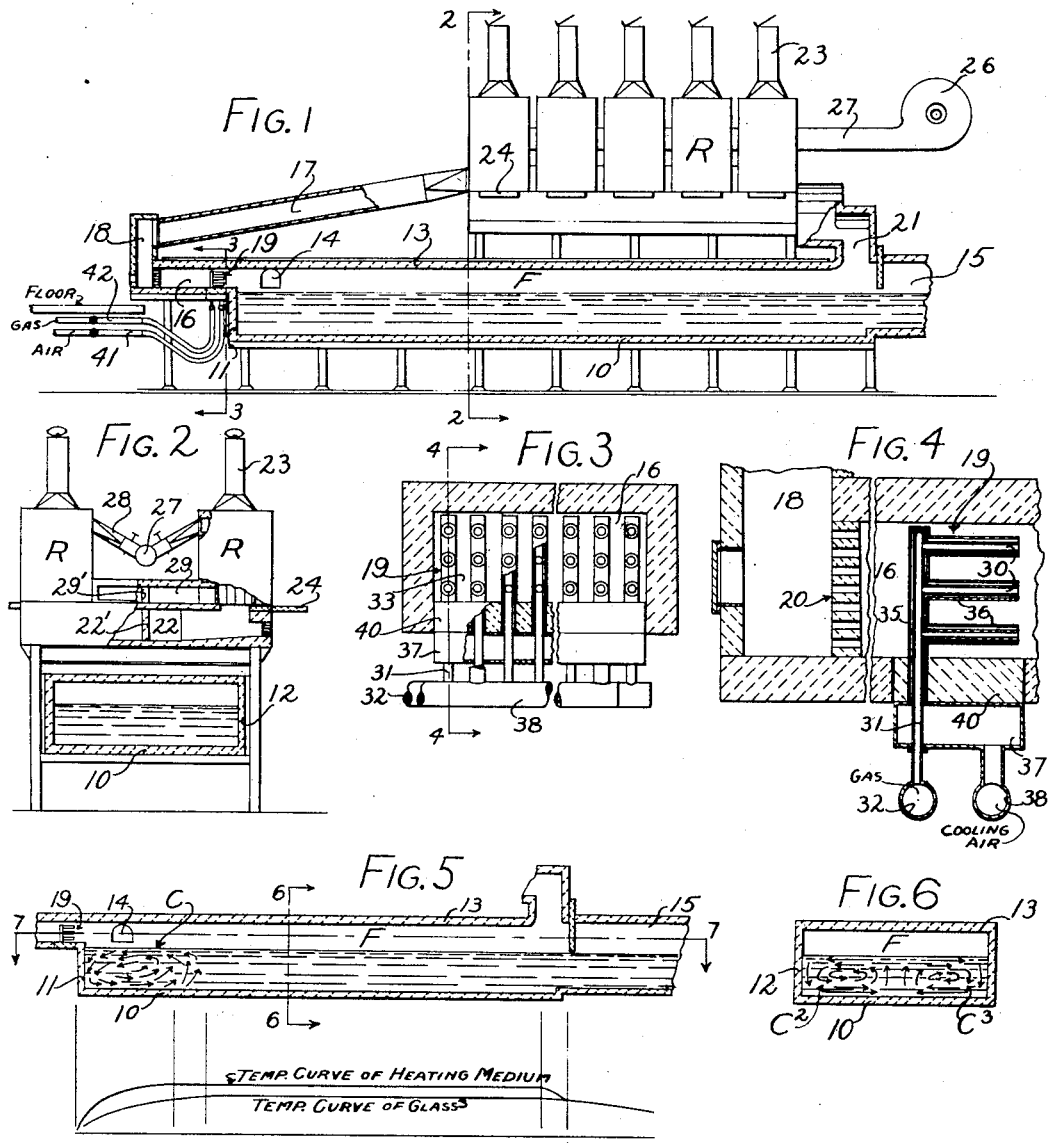

1,900,432

UNITED STATES PATENT OFFICE

ERNEST G. DE CORIOLIS, OF TOLEDO, AND PERCY Q. WILLIAMS, OF OTTAWA HILLS, OHIO, ASSIGNORS TO SURFACE COMBUSTION CORPORATION, OF TOLEDO, OHIO, A CORPORATION OF NEW YORK

GLASS MELTING APPARATUS

Application filed November 12, 1931. Serial No. 574,574.

This invention relates to improvements in continuous glass melting furnaces of the tank type and has for its object to provide a method of and apparatus for heating the material in the tank in a manner to cause the scum or other floating material on the molten mass in the melting portion of the tank to drift or move in a direction away from the refining or outlet end of the tank in order that the refined glass may not become contaminated with said scum or floating material. Another object is to provide ways and means for applying heat uniformly over the full width of the tank and withal to apply the heat in such a manner that notwithstanding that the heating medium is a current of flame flowing longitudinally of the tank in a direction towards the glass outlet end of the latter, there shall be set up in the molten mass in the melting portion of the tank a surface movement of the material in a direction counter to that of the oncoming stream or current of flame.

For a more complete understanding of the invention, reference is made to the detailed description taken in connection with the accompanying drawing wherein:—

Fig. 1 is a partial side elevation and vertical section of a tank type glass-melting furnace embodying the present invention;

Fig. 2 is a transverse section on line 2—2 of Fig. 1, parts being broken away to show the interior construction;

Fig. 3 is a section on line 3—3 of Fig. 1, parts being broken away to show the interior construction;

Fig. 4 is a section on line 4—4 of Fig. 3 on a somewhat larger scale;

Fig. 5 is a central vertical longitudinal section through the melting tank, the arrows in the tank indicating convection currents in the material;

Fig. 6 is a vertical section on line 6—6 of Fig. 5, the arrows in the tank indicating convection currents in the material;

Fig. 7 is a horizontal section on line 7—7 of Fig. 5, the arrows indicating convection currents in the material, and Fig. 8 indicates the relative temperatures of the heating medium and molten glass in the tank as attained by my method of heating.

The tank wherein the material is to be melted is a relatively long and narrow refractory structure comprising a hearth or bottom 10; an end wall 11; side walls 12 and roof 13. Formed in the side walls 12 are openings 14 wherethrough the material to be melted is charged into the tank. The molten glass flows from the tank into a receiving trough or the like 15, forming in effect an extension of the melting tank. The roof 13 is above the normal level of the bath in the tank and forms, in effect, the upper wall of a combustion chamber F wherethrough the heating gases are passed. Extending from one end of the combustion chamber is a rectangular air passage 16 as wide as said chamber. Preheated air from recuperators R is delivered to said passage by way of a conduit 17 which discharges into a header 18 in communication with said passage.

Positioned in the passage 16 is a multinozzled fuel-gas-discharging means or burner generally indicated at 19. The air will be delivered to the passage 16 and the gas will be delivered to the gas-discharging means 19 under substantially the same pressures or under such pressures as will cause the air and gas to flow into the combustion chamber with substantially the same velocity and with minimum turbulence in order that mixing of the air and gas may proceed relatively slowly by inter-diffusion thereby producing delayed combustion.

Since turbulence in a gaseous stream is affected by the rate of flow of the stream, the rate of flow should be relatively low. For practical purposes a rate of flow not materially in excess of six feet per second gives the best results. From the foregoing it will be understood that the air and gas are introduced into the combustion chamber in initially non-mixed condition, the stream as a whole flowing at a relatively low velocity without substantial turbulence in order that combustion may be confined to those zones where the air and gas interdiffuse to a sufficient degree to support combustion. By causing combustion to proceed in the manner indicated, the complex hydrocarbon gases will break down with the liberation of free carbon which becoming incandescent will cause the flame as a whole to become highly radiant as will be readily understood. In order that the air may enter the passage 16 in as quiescent a state as possible, we prefer to provide at the entrance to the passage a screen 20 shown as a multi-apertured refractory slab.

The spent heating gases are discharged from the combustion chamber adjacent to the glass discharge end of the tank through a roof port 21 substantially as wide as said chamber. Overlying the roof in spaced relation is a flue 22 whereinto the gases flowing from the port 21 discharge. Extending along each side of the flue are recuperators R, the gases from the flue flowing upwardly through the recuperators and from thence to a damper controlled outlet 23 for controlling the back pressure in the combustion chamber. The flow of gases from said flue may be controlled by dampers 24 below the respective recuperators. As shown in Fig. 2 the flue may be longitudinally divided by a partition $22^1$.

The air to be preheated is delivered to the upper end of the recuperators for downward flow in a circuitous path. The air is supplied under pressure by a blower 26 at one end of a conduit 27 extending between the rows of recuperators, the conduit being provided with valve-controlled lateral branches 28. The preheated air discharges from the lower end of the recuperators into a collecting main 29 overlying the flue 20, the main delivering into the conduit 17. As shown in Fig. 2, the air main may be longitudinally divided by a partition $29^1$.

Referring now more particularly to Figs. 3 and 4, the burner comprises a multiplicity of spaced, parallel gas nozzles 30 set to discharge in the same direction of flow as the air from the passage 16, each nozzle being of substantial cross sectional area and of such form and construction that gas may be discharged therefrom in stream line flow. Gas is delivered to the nozzles by upright pipes 31 leading from a gas header 32, the pipes being arranged in laterally spaced relation as indicated at 33. The nozzles are arranged in vertical and horizontal series as shown. As previously stated, the gas will be discharged from the nozzles at substantially the same rate of flow as the air flowing from the throat 16 and consequently there will be introduced into the combustion chamber F a composite, initially-unmixed stream of air and gas. The relative capacities of the nozzles 30 and the passage 16 will be such that the desired proportions of air and gas may be had. Normally said proportions will be such as to supply sufficient air for complete combustion of the gas although it is within the spirit of the invention to maintain such proportions of air and gas as will produce an underventilated or overventilated flame.

Cooling means comprising jackets 35 and 36 are provided for the gas pipes 31 and nozzles 30 respectively, the jackets 36 being in communication with the jackets 35 and the latter receiving cooling medium from a manifold 37 whereinto the medium is introduced by a supply pipe 38. The primary purpose of the cooling means is to prevent the gas flowing to the nozzles 30 from decomposing or breaking down with the liberation of free carbon with consequent clogging of the said nozzles. The cooling medium is cool air and the same is discharged from the nozzle jackets 36 at the discharge end of the nozzles, the jackets being open at said end whereby the cooling air and the fuel gas both discharge in a common direction, namely into the combustion chamber. The cooling air will be supplied at such pressure that it will issue from the jackets 36 with the same velocity as the gas or, in other words, with the same velocity as the preheated air discharged from the passage 16.

It is desirable that the burner 19 be removable from the passage 16 for inspection and repairs and to that end a portion 40 of the bottom wall of the passage 16 is made removable, the burner being secured to and supported by said portion, it being noted that the cooling-air manifold 37 is arranged below said portion in contact therewith. Any suitable means, not shown, serve to lower and raise said portion 40 as may be required. Referring to Fig. 1, the cooling-air supply main is indicated at 41 and the gas supply main at 42, said mains being connected to their respective distributing pipes 38 and 32 by flexible tubes.

The burner 19 herein described is to be taken as illustrative of a type of burner apparatus for producing a flame having the characteristics indicated.

The mode of operation of the furnace is substantially as follows:—

The flow of air from the passage 16 and the flow of gas from the burner 19 are respectively so regulated that air and gas will enter the combustion chamber as one stream without substantial turbulence and consequently without any undue tendency for the gas to mix with the air except by interdiffusion. The proportions of air and gas are normally so maintained that substantially complete combustion of the gas will occur before leaving the combustion chamber although it is within the spirit of the invention to maintain either an underventilated or overventilated flame.

Combustion of the fuel takes place as the air and gas interdiffuse to a sufficient degree to support combustion and since such diffusion is progressive, combustion proceeds continuously in the direction of flow of the fuel. Moreover, since combustion occurs in the manner indicated, it follows that underventilated portions of fuel adjacent to the zone of combustion will become highly heated with resultant breakdown of its complex hydrocarbon constituents, such breakdown resulting in the liberation of free carbon which becomes incandescent with the result that the gaseous body as a whole becomes highly radiant. In other words, by introducing the air and gas into the combustion chamber in nonmixed condition, and the air and gas flowing without substantial turbulence and the gas being imbedded as it were in the form of cores or layers in a plenum of air, combustion of the fuel will persist for a considerable time interval after being introduced into the combustion chamber with consequent production of a long and highly radiant flame.

Since the flame has, from its beginning, a spread as wide as the combustion chamber, it follows that the temperature in said chamber will be uniform crosswise of the tank. However, since combustion is dependent upon the interdiffusion of the gas and air and since an appreciable time interval is required before such interdiffusion is complete, it follows that the maximum temperature in the combustion chamber and hence also in the tank will be attained not in close proximity to the burner but at a substantial distance therefrom as indicated by the temperature curves in Fig. 8. This temperature condition is, of course, conducive to the setting up of convection currents in the molten mass in a counterclockwise direction as viewed in Figure 5 and as indicated by the group of arrows 6 with the result that floating scum or the like will tend to move or drift in a direction towards the burner from a point a substantial distance therefrom.

As is well known to those skilled in the art, when a charge or "ball" of raw matter is introduced into the tank it floats on the surface of the previously melted glass and starts to melt while the interior portions are still relatively cold. As melting of the raw material proceeds, there is an immediate evolution of gas with resultant formation of bubbles, the walls of which, eventually becoming hotter and less tenacious, burst and expose cool area of the unmelted material. In due course the sand, which is the last material to dissolve, is completely in solution. At this stage when the glass is just "out of the sand", it is a foaming liquid, filled with bubbles of all sizes. It is therefore self-evident that fining of said liquid will be materially expedited by the convection currents C at the melting portion of the tank. Since the side walls 12 of the tank are relatively cool, there will also be set up transverse convection currents as indicated by the groups of arrows $C^2$ and $C^3$ in Fig. 6 and $C^1$ in Fig. 7 but there transverse convection currents will be relatively sluggish as compared with the convection currents C induced by the temperature condition resulting from burning the fuel in the manner described.

It will be readily appreciated that convection currents of the type indicated are highly desirable to the production of properly fined and refined glass. The hereindescribed method of heating a glass tank is believed to be basically new in the art and consequently while certain features of construction have been described with considerable particularity, no limitations are intended except as defined in the appended claims.

What we claim is:

1. In a glass melting furnace, the combination of an elongate melting tank, a roof overlying the tank in spaced relation and forming therewith an elongate combustion chamber, means for discharging fuel gas lengthwise of the chamber in spaced parallel streams without substantial turbulence and for supplying air without substantial turbulence between said streams for parallel flow therewith, said means being positioned at that end of said chamber adjacent to the charging end of the tank and being substantially as wide and high as the chamber at said end.

2. In a glass melting furnace, the combination of an elongate melting tank, a roof overlying the tank in spaced relation and forming therewith an elongate combustion chamber, means for discharging fuel gas lengthwise of the chamber in spaced parallel streams without substantial turbulence, said means being positioned at that end of said chamber adjacent to the charging end of the tank and being substantially as wide and high as the chamber at said end, and means associated with said means for supplying preheated air without substantial turbulence between said streams for parallel flow therewith.

3. In a glass melting furnace, the combination of an elongate melting tank, a roof overlying the tank in spaced relation and forming therewith an elongate combustion chamber, means positioned at that end of said chamber adjacent to the charging end of the tank for discharging fuel gas straight-away into said chamber without substantial turbulence, said means being substantially as wide and high as said chamber and comprising vertically-spaced, transversely-extending rows of gas nozzles having their axes in parallelism, and means associated with said means for introducing air into said chamber for parallel flow with the gas discharged from said nozzles.

4. In a glass melting furnace, the combination of an elongate melting tank, a roof overlying the tank in spaced relation and forming therewith an elongate combustion chamber, means forming a passage opening into said chamber at that end of the latter adjacent to the charging end of the tank, the passage being substantially as wide and high as the chamber at said end, means for supplying preheated air to said passage for flow into said chamber, and a plurality of vertically-spaced transversely-extending rows of nozzles positioned in said passage for discharging fuel gas into said chamber in parallel streams without substantial turbulence.

5. In a glass melting furnace, the combination of an elongate melting tank, a roof overlying the tank in spaced relation and forming therewith an elongate combustion chamber, means forming a passage opening into said chamber at that end of the latter adjacent to the charging end of the tank, the passage being substantially as wide and high as the chamber at said end, means for supplying preheated air to said passage for flow into said chamber, and a plurality of vertically-spaced horizontally-disposed rows of gas nozzles positioned in said passage for discharging fuel gas with stream line flow into said chamber, the axes of said nozzles being in parallelism lengthwise of said chamber.

6. In a glass melting furnace, the combination of an elongate melting tank, a roof overlying the tank in spaced relation and forming therewith an elongate combustion chamber, means forming a passage opening into said chamber at that end of the latter adjacent to the charging end of the tank, the passage being substantially as wide and high as the chamber at said end, means for supplying preheated air to said passage for flow into said chamber, a plurality of vertically-spaced horizontally-disposed rows of gas nozzles positioned in said passage for discharging fuel gas with stream line flow into said chamber, the axes of said nozzles being in parallelism lengthwise of said chamber, and means including a removable portion of the wall of said passage for supporting said nozzles.

7. In a glass melting furnace, the combination of an elongate melting tank, a roof overlying the tank in spaced relation and forming therewith an elongate combustion chamber, means forming a passage opening into said chamber at that end of the latter adjacent to the charging end of the tank, the passage being substantially as wide and high as the chamber at said end, means for supplying preheated air to said passage for flow into said chamber, a plurality of vertically-spaced horizontally-disposed rows of gas nozzles positioned in said passage for discharging fuel gas with stream line flow into said chamber, the axes of said nozzles being in parallelism lengthwise of said chamber, means including a removable portion of the wall of said passage for supporting said nozzles, and means extending through said wall portion for supplying gas to said nozzles.

8. A method of causing scum and the like on the surface of a body of molten glass contained in an elongate tank having an overlying roof forming with the tank an elongate heating chamber to drift towards one end of the tank from a point intermediate the ends of the tank comprising introducing into said chamber in a directon from the said one end towards said point a plurality of substantially non-turbulent streams of fuel gas, the streams being in vertically spaced relation and flowing in the same parallel direction lengthwise of said chamber, and supporting combustion of the gas by flowing in initially parallel and contacting relation with said streams a substantially non-turbulent current of air, the cross-sectional area of the composite stream of air and gas being initially the same as the cross-sectional area of said chamber.

9. A method of producing molten glass in an elongate melting tank having an overlying roof forming with the tank an elongate heating chamber, comprising feeding the raw material into one end of the tank, continuously withdrawing the molten material from the other end of the tank, and subjecting the material in the tank to the action of a current of flame flowing lengthwise of and filling said chamber, the flame being produced by flowing into that end of the chamber adjacent to the charging end of the tank, a plurality of parallelly flowing streams of fuel gas, the streams being in vertically spaced relation and flowing without substantial turbulence and flowing between said streams for parallel flow therewith a current of air for supporting combustion of the gas.

10. A method of producing molten glass in an elongate melting tank having an overlying roof forming with said tank an elongate heating chamber, comprising liberating heat within said chamber substantially uniformly crosswise of the tank and at a gradually increasing rate for a substantial distance lengthwise of the chamber, and feeding the raw material into that portion of the tank where the rate of heat liberation is increasing.

In testimony whereof we affix our signatures.

ERNEST G. de CORIOLIS.
PERCY Q. WILLIAMS.